United States Patent [19]

Aoyama et al.

[11] Patent Number: 5,193,997
[45] Date of Patent: Mar. 16, 1993

[54] APPARATUS FOR PREHEATING GRANULAR MATERIAL

[75] Inventors: Mikio Aoyama; Isao Hashimoto, both of Akashi; Jun Tatebayashi, Takarazuka, all of Japan

[73] Assignees: Kawasaki Jukogyo Kabushiki Kaisha, Kobe; Maruo Calcium Co., Ltd., Hyougo, both of Japan

[21] Appl. No.: 719,627

[22] Filed: Jun. 24, 1991

[30] Foreign Application Priority Data

Jun. 26, 1990 [JP] Japan .................................. 2-169449

[51] Int. Cl.⁵ .............................................. F27B 15/00
[52] U.S. Cl. ..................................... 432/106; 432/13; 432/58
[58] Field of Search ............................ 432/13, 58, 106

[56] References Cited

U.S. PATENT DOCUMENTS

| | | | |
|---|---|---|---|
| 3,738,794 | 6/1973 | Thelen | 432/106 |
| 4,039,277 | 8/1977 | Kobayashi et al. | 432/106 |
| 4,504,319 | 3/1985 | Wolter et al. | 432/106 |
| 4,527,973 | 7/1985 | Konocloh et al. | 432/58 |
| 4,664,625 | 5/1987 | Desmidt | 432/106 |
| 5,049,198 | 9/1991 | Ribas | 432/106 |

FOREIGN PATENT DOCUMENTS

| | | |
|---|---|---|
| 3829853 | 11/1989 | Fed. Rep. of Germany . |
| 7533801 | 6/1976 | France . |
| 53-110624 | 9/1978 | Japan . |
| 63-1196 | 3/1988 | Japan . |
| 2-63544 | 2/1990 | Japan . |
| 960868 | 6/1964 | United Kingdom . |

OTHER PUBLICATIONS

Chem. Abstr. vol. 108, No. 4, "Firing Apparatus for Cement Clinker"; Jan. 25, 1988, Abstract No. 26332H.

*Primary Examiner*—A. Michael Chambers
*Attorney, Agent, or Firm*—Leydig, Voit & Mayer

[57] ABSTRACT

An apparatus for preheating a granular material having a suspension preheater including a plurality of stages of cyclones arranged above a calcination furnace such that the granular material is preheated by waste gas from the calcination furnace as the granular material passes through the suspension preheater. The apparatus has a precalciner of fluidized-bed type or spouted-bed type connected, in place of a duct used in conventional apparatus, between a collecting cyclone directly connected to be calcination furnace and a first cyclone constituting the most downstream stage.

10 Claims, 5 Drawing Sheets

APPARATUS FOR PREHEATING GRANULAR MATERIAL

BACKGROUND OF THE INVENTION

The present invention relates to an apparatus for preheating, by using a suspension preheater, a granular material and or including powder material (called simply as granular material) such as limestone, dolomite or the like.

A material such as limestone, dolomite or the like is preheated in a suspension preheater having a plurality of cyclones arranged to form multiple stages, by heat which is derived from gases wasted from a calcination furnace. The preheated material is then introduced into and treated in the calcination furnace spas to become lime or magnesium oxide, through a reaction expressed by the following formula (1) or (2):

$$CaCO_3 \rightarrow CaO + CO_2 \quad (1)$$

$$MgCO_3 \rightarrow MgO + CO_2 \quad (2)$$

In general, in a suspension preheater, calcined granules accompanying the waste gas and carbon dioxide gas contained in the waste gas make a re-carbonating reaction as expressed by the following formula (3) or (4) at a temperature ranging between about 600° C. and 800° C.:

$$CaO + CO_2 \rightarrow CaCO_3 \quad (3)$$

$$MgO + CO_2 \rightarrow MgCO_3 \quad (4)$$

Limestone or magnesium carbonate generated as a result of the re-carbonating reaction has been finely pulverized, so that deposition of hard matters occurs on the inner walls of the cyclones constituting the suspension preheater in the above-mentioned temperature range. The deposition of hard, matters, referred to also as "coating" grows heavy the longer the suspension preheater operates, thus hampering continuous operation of the suspension preheater, as known to those skilled in the art.

Another problem is that proper exchange of heat between the material and, the waste gas cannot be made because the period of residence of the material in the duct of the suspension preheater is too short. As a consequence, the temperature of the waste gas is raised to increase the heat consumption.

As a measure for overcoming the above-described problems, a method has been proposed in Japanese Patent Laid-Open Publication No. 53-110624 in which the duct is restricted at its intermediate portion so as to realize a jet layer structure in which the waste gas and the material form mutually contacting counter flows, aiming at increasing the period of stay and improving the heat exchanging efficiency. This preheating measure, however, is still unsatisfactory. Namely, although a restriction is provided in the duct to increase the period of stay of the material, the material can stay in the duct only for an extremely short period because the velocity of the waste gas has to be 35 m/s to 40 m/s in order to blow the material particles of a particle size around 4 mm. Thus, the exchange of heat between the material and the waste gas is insufficient and the problem of large heat consumption still remains unsolved. Furthermore, supply of the material at an excessively large rate into a cyclone from a cyclone just upstream thereof may allow the material to directly reach the downstream cyclone, with the result that the quality of the product is deteriorated due to mixing of raw material.

Proposals are also made for the purpose of obviating the above-described problems of the prior art. For instance, Japanese Utility Model Publication No. 63-1196 discloses an apparatus in which cyclones of the stage or stages which develop temperatures between 600 and 800° C. where the re-carbonation reaction takes place are arranged in a plurality of parallel lines which are alternately used to enable a continuous operation of the suspension preheater. Japanese Utility Model Laid-Open No. 2-63544 also discloses an apparatus in which a plurality of parallel cyclones are used in a switching manner. In this type of apparatus, the temperature of waste gas tends to be elevated due to, for example, a rise in the calcination temperature in the calcination furnace and insufficiency of the heat exchange conducted in the suspension preheater. Consequently, the aforementioned coating due to re-carbonation takes place not only in the parallel cyclones which designed to operate at the aforesaid temperature range but also in the cyclones which are on the upstream side of these parallel cyclones. Consequently, the preheating apparatus requires renewal or switching of these upstream cyclones, failing to meet the aforesaid requirement for long continuous operation.

SUMMARY OF THE INVENTION

Accordingly, an object of the present invention is to overcome the above-described problems of the prior art.

According to the invention, a granular material preheating apparatus, having a suspension preheater composed of a plurality of cyclones arranged in stages above a calcination furnace, is provided with a heat exchanger (precalciner) of fluidized-bed type or spouted-bed type disposed in place of a duct at a junction between adjacent cyclones so as to enable a sufficient exchange of heat between the supplied granular material and the waste gas, so as to maintain the waste gas temperature below the re-carbonation temperature, thereby ensuring that no coating with re-carbonation product takes place in the cyclones or that re-carbonation takes place only in predetermined cyclone or cyclones.

Thus, according to the present invention, there is provided an apparatus for preheating a granular material having a suspension preheater including a plurality of stages of cyclones arranged above a calcination furnace such that the granular material is preheated by waste gas from the calcination furnace as the granular material passes through the suspension preheater, the apparatus comprising: a heat exchanger (precalciner) of fluidized-bed type or spouted-bed type connected between a collecting cyclone directly connected to the calcination furnace and a first cyclone constituting the most downstream stage.

In a specific form of the present invention, the apparatus further comprises an additional heat exchanger of fluidized-bed type or spouted-bed type connected between the first cyclone and a second cyclone which is immediately upstream of the first cyclone.

In another specific form of the present invention, the apparatus further comprises another additional heat exchanger of fluidized-bed type or spouted-bed type connected between the second cyclone and a third cyclone which is immediately upstream of the second cyclone.

In still another specific form of the present invention, the apparatus further comprises an auxiliary burner in the heat exchanger.

DESCRIPTION OF THE PREFERRED EMBODIMENTS

Preferred embodiments of the present invention will be described in detail with reference to the accompanying drawings.

Figure 1:
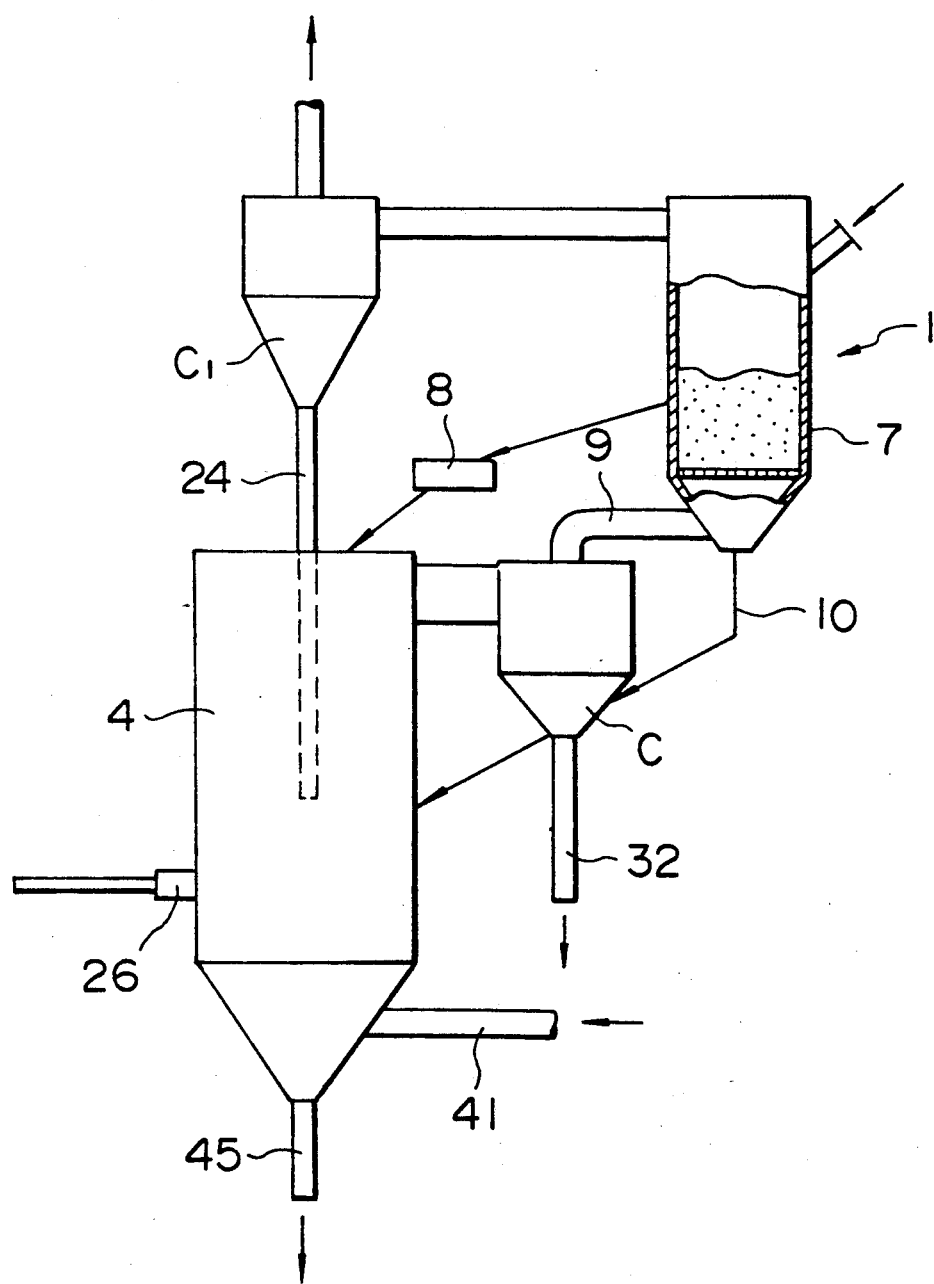
FIG. 1 is a partly cut-away front elevational view of an apparatus for preheating granular material in accordance with the present invention.
Figure 2:
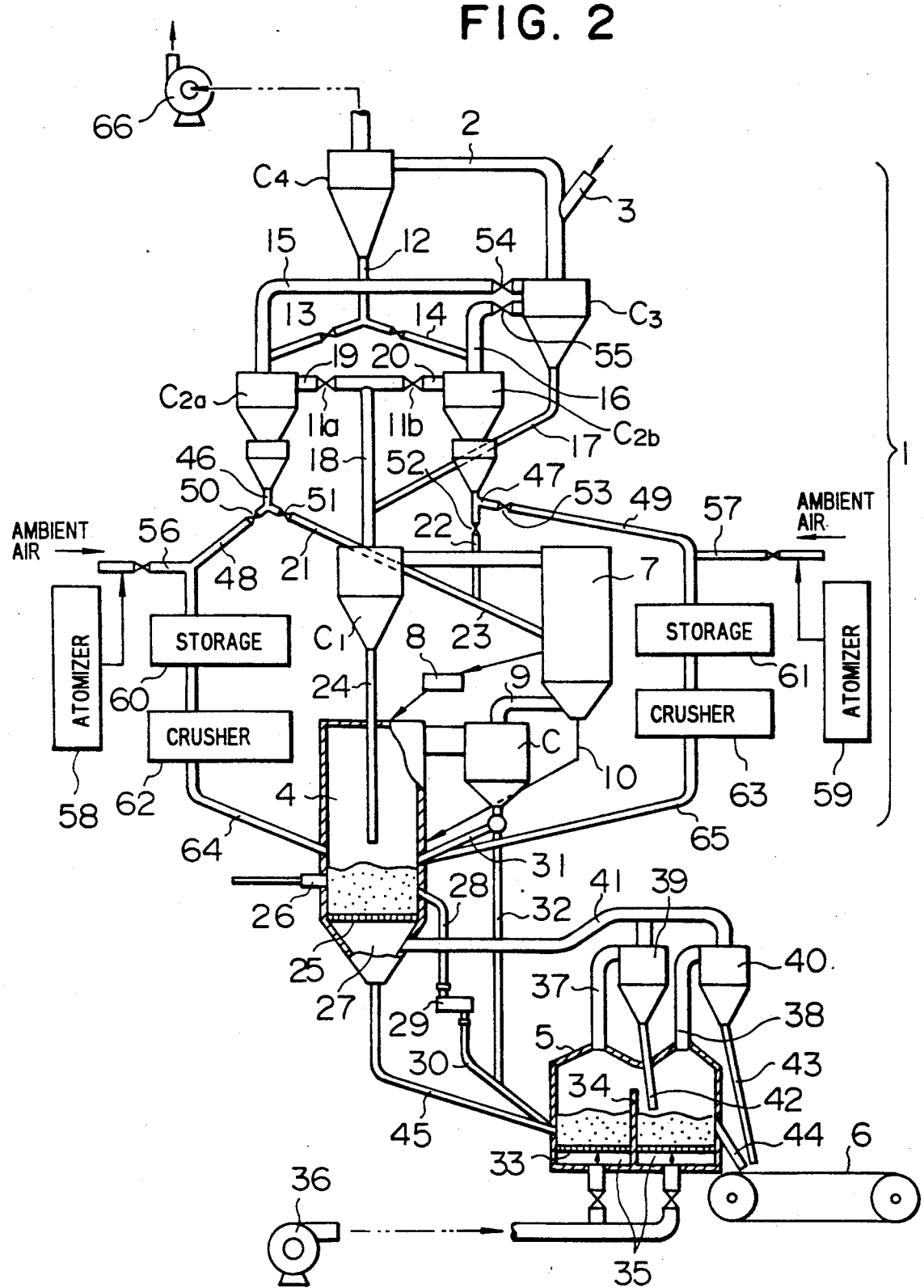
FIG. 2 is a partly cut-away front elevational view of a suspension preheater incorporating the preheating apparatus of FIG. 1 and having a plurality of stages of cyclones including stages having a pair of parallel cyclones.

Referring to FIGS. 1 and 2 showing a first embodiment of the present invention, in particular to FIG. 2, a plurality of cyclones $C_1$, $C_{2a}$, $C_{2b}$, $C_3$ and $C_4$ are arranged in a multiplicity of stages which form a suspension preheater generally denoted by 1. A material chute 3 is connected to a duct which connects the cyclones $C_3$ and $C_4$ to each other. In operation, a granular material such as limestone or dolomite is put into the material chute 3 and is preheated by a waste gas coming from a fluidized bed calcination furnace 4, and the preheated material is successively charged into the calcination furnace 4 so as to be calcined. The product calcined in the calcination furnace 4 is collected by a collecting cyclone C and is cooled through a fluidized bed cooler 5. The cooled material as the product is taken out through a conveyor 6. According to the invention, the duct which interconnects the collecting cyclone C and the cyclone $C_1$ of the most downstream stage of the suspension heater 1 is replaced by a fluidized-bed type or spouted-bed type heat exchanger (precalciner) 7 so as to receive granular material preheated by the suspension preheater 1. The waste gas, which is discharged from the collecting cyclone C at a velocity of about 40 m/s, is decelerated to 2 to 5 m/s through the precalciner 7. In addition, the preheated granular material is allowed to stay in the precalciner for a comparatively long period of about 4 to 10 minutes. As a consequence, heat is sufficiently exchanged between the preheated granular material and the waste gas. The material is then put into the calcination furnace 4 through an L valve 8. In order to prevent the uncalcined granular material in the precalciner 7 from directly flowing into the collecting cyclone C due to an unexpected reason, the duct 9 interconnecting the collecting cyclone C and the incinerator 7 preferably has an elbow-like form shown in FIG. 1. Numeral 10 denotes a conduit which interconnects the lower end of the precalciner 7 to the calcination furnace 4. Uncalcined granular material, which happened to fall from the precalciner 7, is put into the precalciner furnace 4.

A description will now be given of the operation of the preheating apparatus, with specific reference to FIG. 2. The embodiment shown in FIG. 2 has a plurality of stages of cyclones $C_1$ to $C_4$ which form the suspension preheater 1. The suspension preheater is so designed and constructed that the stage which develops a temperature of 600 to 800° C. at which re-carbonation reaction and, hence, the coating take place is constituted by a pair of cyclones $C_{2a}$, $C_{2b}$ which are switchable.

Figure 5:
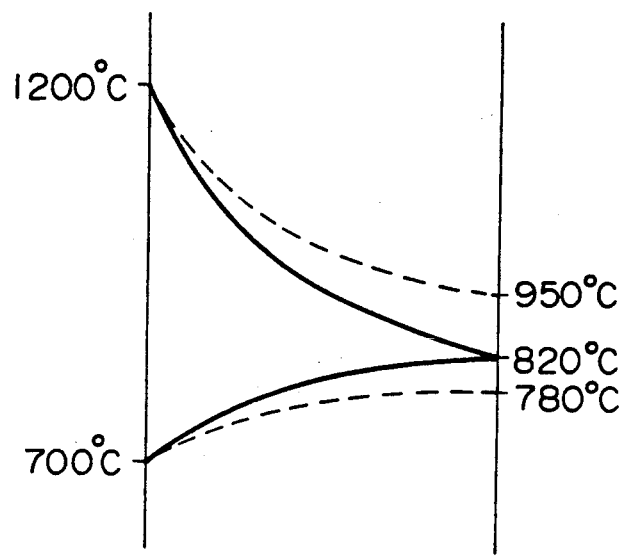
FIG. 5 is a graph showing the heat-exchange temperature characteristic of the first cyclone shown in FIG. 1.

The reason why such a switchable arrangement is used will be described with reference to FIG. 5 which shows the temperature characteristic of the cyclone $C_1$. In FIG. 5, the temperature characteristic as obtained in the apparatus of the present invention is shown by a solid-line curve, while the characteristic of the conventional apparatus is shown by broken-line curve. In the conventional apparatus, the granular material supplied into the duct between the collecting cyclone C and the most downstream cyclone $C_1$ has been heated to, for example, about 700° C. On the other hand, the temperature of the waste gas from the collecting cyclone is, for example, about 1200° C. Under such temperature conditions, the material exhibits only a small rate of temperature rise, e.g., to about 780° C., while the temperature of the waste gas from the cyclone $C_1$ still remains as high as about 950° C., due to too short period of heat exchange in the duct. In the conventional apparatus, therefore, the waste gas temperatures in the cyclones $C_{2a}$ and $C_{2b}$ are correspondingly high so that a high temperature falling within the recarbonation temperature range between 600 and 800° C. is established in the upstream stage in which a single cyclone $C_3$ is used alone. In order to prevent the "coating" in this stage, therefore, it is necessary to employ a dual arrangement composed of parallel cyclones also for this stage. This problem, however, is overcome by the embodiment of the present invention shown in FIG. 2. Namely, in this embodiment, the material of about 700° C. put into the precalciner 7 is allowed to make a sufficient heat exchange with the waste gas within the precalciner 7, so that the material can be heated up to, for example, 820° C. before entering the calcination furnace 4. In addition, the temperature of the waste gas coming from the cyclone $C_1$ also can be lowered to about 820° C. which is about 130° C. lower than that in the conventional apparatus. Consequently, the re-carbonation temperature of 600 to 800° C. is developed only in the stage having the dual arrangement of cyclones $C_{2a}$ and $C_{2b}$. Thus, in the embodiment shown in FIG. 2, the re-carbonation reaction is allowed to occur only in the cyclones $C_{2a}$ and $C_{2b}$ and does never occur in the cyclones of other stages.

The cyclones $C_{2a}$ and $C_{2b}$ are connected in parallel through valves 11a and 11b which are selectively operable to allow either one of the cyclones $C_{2a}$ and $C_{2b}$ to occur, while the operation of the other is suspended. The granular material supplied from the above-mentioned chute 3 is introduced through a duct 2 into the cyclone $C_4$. The granular material from the cyclone $C_4$ is introduced into a common chute 12 which branches into two branch chutes 13 and 14 connected to ducts 15 and 16 so as to be charged into the cyclone $C_3$. The material from the cyclone $C_3$ is put into a duct 18 through a chute 17 which branches into ducts 19 and 20 leading to the parallel cyclones $C_{2a}$ and $C_{2b}$.

The material collected by the cyclones $C_{2a}$ and $C_{2b}$ is supplied into the precalciner 7 via a chute 21 or a chute 22 and then through a common chute 23. The material thus supplied into the precalciner 7 is fluidized for about 4 to 10 minutes by the flow of the waste gas from the cyclone C so as to be sufficiently preheated through a heat exchange with this waste gas. The thus preheated waste gas is then supplied into the calcination furnace 4 through the aforementioned L valve 8. Part of the preheated material flows out the precalciner 7 together with the flow of the waste gas so as to be introduced into the cyclone $C_1$. This part of the preheated material is trapped by the cyclone $C_1$ and is charged into the calcination furnace 4 through a chute 24. In the calcination furnace 4, the material is laid on a distribution plate 25 and is fluidized by air from a wind box 27 while being heated by a burner 26, so as to be calcined. The thus calcined product is introduced to the aforementioned cooler 5 through a chute 28, an L valve 29 which conducts the material seal, and then through a chute 30.

Fine particles of the material discharged from the calcination furnace 4 are collected by a collecting cyclone C. Part of the fine particles is returned to the calcination furnace 4 through a chute 31, while the remaining part of the fine particles is introduced into the cooler 5 through a chute 32. The cooler 5 is provided with a distribution plate 33 and a partition plate 34 which in combination form pneumatic chambers 35. Pressurized air is introduced into these pneumatic chambers 35 by means of a forced draft blower 36. from the cooler 5 is supplied to cyclones 39, 40 through ducts 37, 38 and is then supplied as combustion air into a wind box 27 of the calcination furnace 4 through the duct 41. The product collected by the cyclone 39 is introduced from the chute 42 into the cooler 5 and the product collected in the cyclone 40 is delivered through a chute 43 to the aforementioned conveyor 6 which also conveys the product discharge from the cooler 5 through the chute 44. Numeral 45 designates a chute through which the product introduced from the duct 41 into the wind box 24 is supplied into the cooler 5.

The parallel cyclones $C_{2a}$ and $C_{2b}$ are supplied with waste gas containing granular materials through the ducts 19 and 20. The granular material is trapped by the cyclones $C_{2a}$ and $C_{2b}$ and then supplied into the precalciner 7 through the chutes 46, 47 and then through the chutes 21, 22, while the cleaned gas is discharged through the ducts 15 and 16. The chute 46 branches into the chutes 21 and 48 having valves 50 and 51. The chute 47 branches into the chutes 22 and 49 having valves 52 and 53, respectively. The ducts 15 and 16 are respectively provided with valves 54 and 55. Numeral 56 and 57 denote pipes communicating with ambient air, 58 and 59 denote atomizing means for supplying stomized water, 60 and 61 denote containers for storing matters depositing in the cyclones $C_{2a}$ and $C_{2b}$ and discharged through the chutes 48 and 49, and 62 and 63 denote crushers for crushing deposited matters. The crushed deposited matters are introduced into the above-mentioned calcination furnace 4 through the chutes 64 and 65. Numeral 66 designates a waste gas fan. The "coating" matter deposited on the walls of the cyclones $C_{2a}$ and $C_{2b}$ as a result of re-cargonation can be removed by for example, an apparatus which is disclosed in Japanese Patent Laid-Open No. 2-63544 mentioned before. This apparatus is not described in detail because it does not for many critical portion of the present invention.

Figure 6:
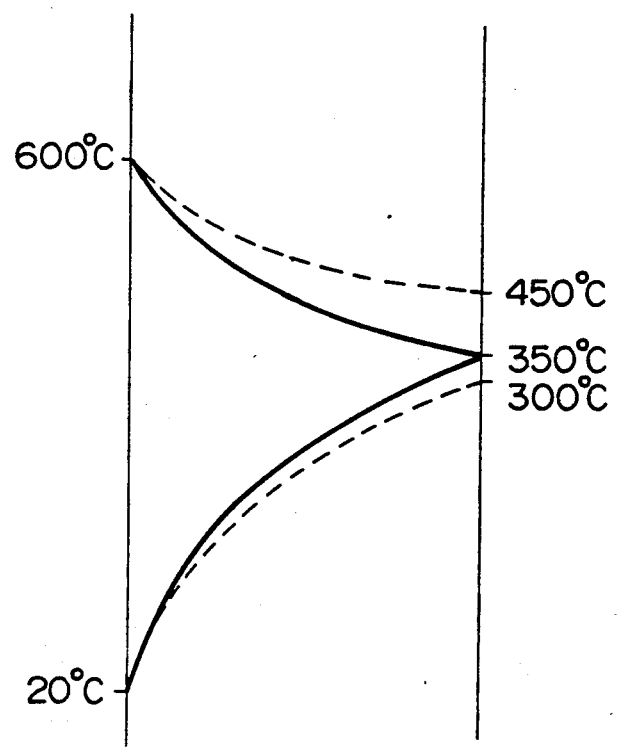
FIG. 6 is a graph showing the heat-exchange temperature characteristic of the fourth cyclone shown in FIG. 2.

A description will now be given of the temperature characteristic in the cyclone $C_4$ shown in FIG. 6. In FIG. 6, the solid-line curve shows the temperature characteristic as attained in the present invention in which the duct 2 of the conventional arrangement is substituted by the heat exchanger 7a. In operation, as the granular material of a normal temperature (about 20° C.) is supplied from the material supply chute 3, heat is exchanged between the granular material and the waste gas of about 600° C. so that the material is preheated to about 350° C. while the waste gas temperature is lowered to about 350° C. The waste gas thus cooled through the exchange of heat is discharged to the atmosphere. The temperature characteristic of the conventional apparatus is shown by a broken line in the same FIG. A temperature differential as large as about 150° C. was observed between the final preheat temperature of the granular material and the discharged waste gas, suggesting insufficient exchange of heat between the granular material and the gas.

Figure 3:
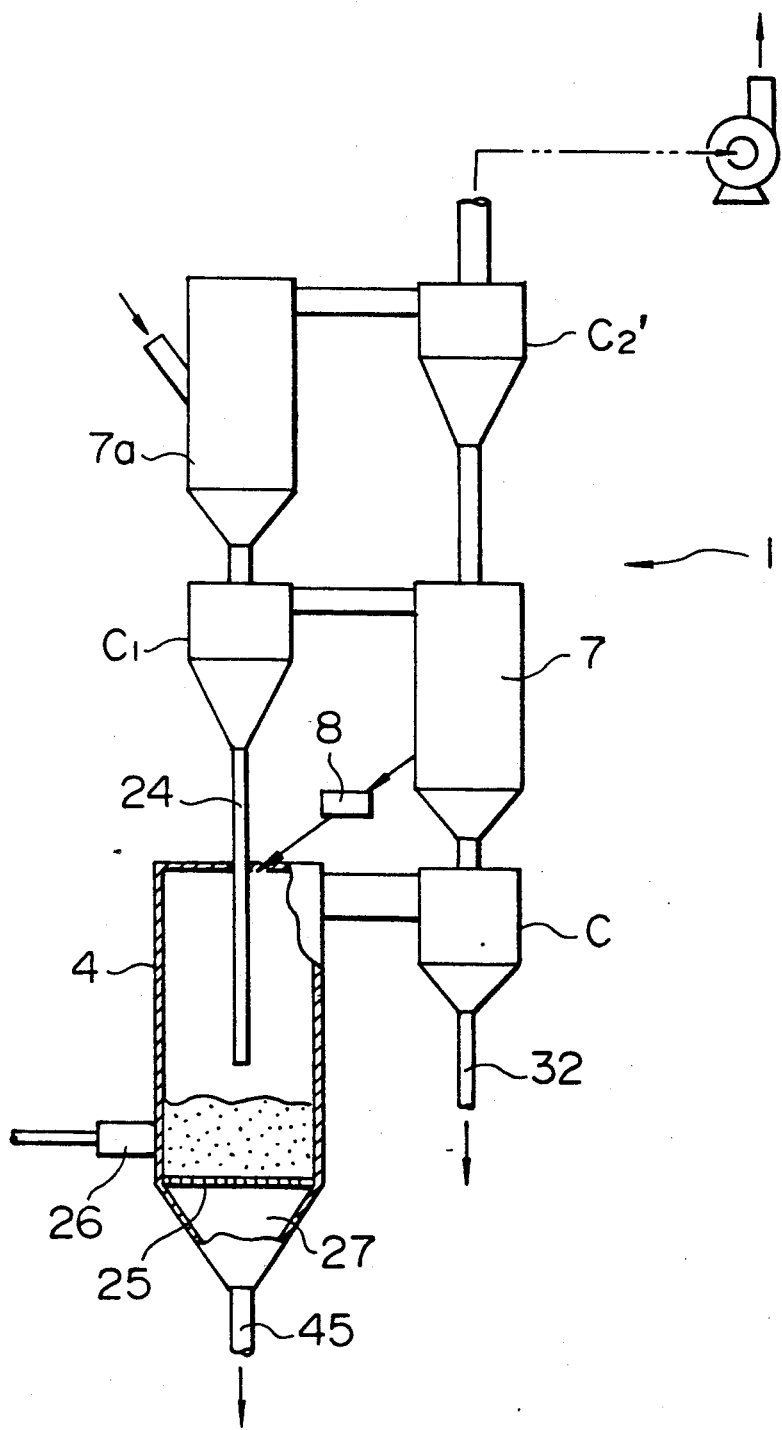
FIG. 3 is a partly cut-away front elevational view of a system in which the preheating apparatus of the present invention are used in plural in place of the parallel arrangement of cyclones shown in FIG. 2.

A description will now be given of another embodiment of the present invention with reference to FIG. 3. Although this embodiment employs only two stages of cyclones $C_1$ and $C_2$, it is possible to form a multiplicity of stages by adding, for example, cyclones $C_3$ and $C_4$ as illustrated in FIG. 2. This embodiment is similar to the basis arrangement of the invention shown in FIG. 1 but is additionally provided with a heat exchanger 7a of fluidized-bed or spouted-bed type used in place of the duct interconnecting the cyclones $C_1$ and $C_2$ in the arrangement shown in FIG. 1. Thus, the embodiment shown in FIG. 3 employs a pair of heat exchanger 7 and 7a so as to keep all the stages of cyclones of the suspension preheater 1 out of the re-carbonation temperature range of 600 to 800° C., while ensuring that heat is sufficiently exchanged between the waste gas and the granular material. Thus, the embodiment shown in FIG. 3 is different from the embodiment shown in FIG. 1 in that the additional heat exchanger 7a is used and is supplied with granular material of normal temperature or granular material supplied through a duct connected to another cyclone $C_3$ or $C_4$ and preheated by such a cyclone.

The advantage of this embodiment will be described with reference to FIG. 5 showing the temperature characteristic. The waste gas discharged from the cyclone $C_1$ and cooled to about 820° C. through exchange of heat is supplied to the heat exchanger 7a so as to exchange heat with the material while fluidizing the material. During the exchange of heat conducted in fluidized state for about 4 to 10 minutes, the granular material supplied at the normal temperature (about 20° C.) is preheated to about 450° C. At the same time, the waste gas supplied from the heat exchanger 7a to the cyclone $C_2$ of the next stage is lowered to about 450° C. As a consequence, waste gas which has been cleaned and cooled to a temperature below 450° C. is relieved to the atmosphere and the granular material which has been collected and preheated by the cyclone $C_2$ to 450° C. is supplied into the precalciner 7. Heat is exchanged sufficiently in the precalciner 7 so that the granular material is preheated to about 820° C. and the thus preheated granular material is supplied into the calcination furnace 4 through the L valve 8. The material collected and preheated by the cyclone $C_1$ to about 820° C. also is supplied into the calcination furnace 4 through the chute 24. Thus, the re-carbonation temperature ranging between 600 and 800° C. is established in none of the stages of cyclones of the suspension preheater 1. As a consequence, the undesirable "coating" with re-carbonation products is eliminated, as well as the necessity for parallel switchable arrangement of cyclones $C_{2a}$ and $C_{2b}$. Thus, the arrangement shown in FIG. 3 offers a simplification of the construction of the apparatus over the embodiment described in connection with FIGS. 1 and 2.

Figure 4:
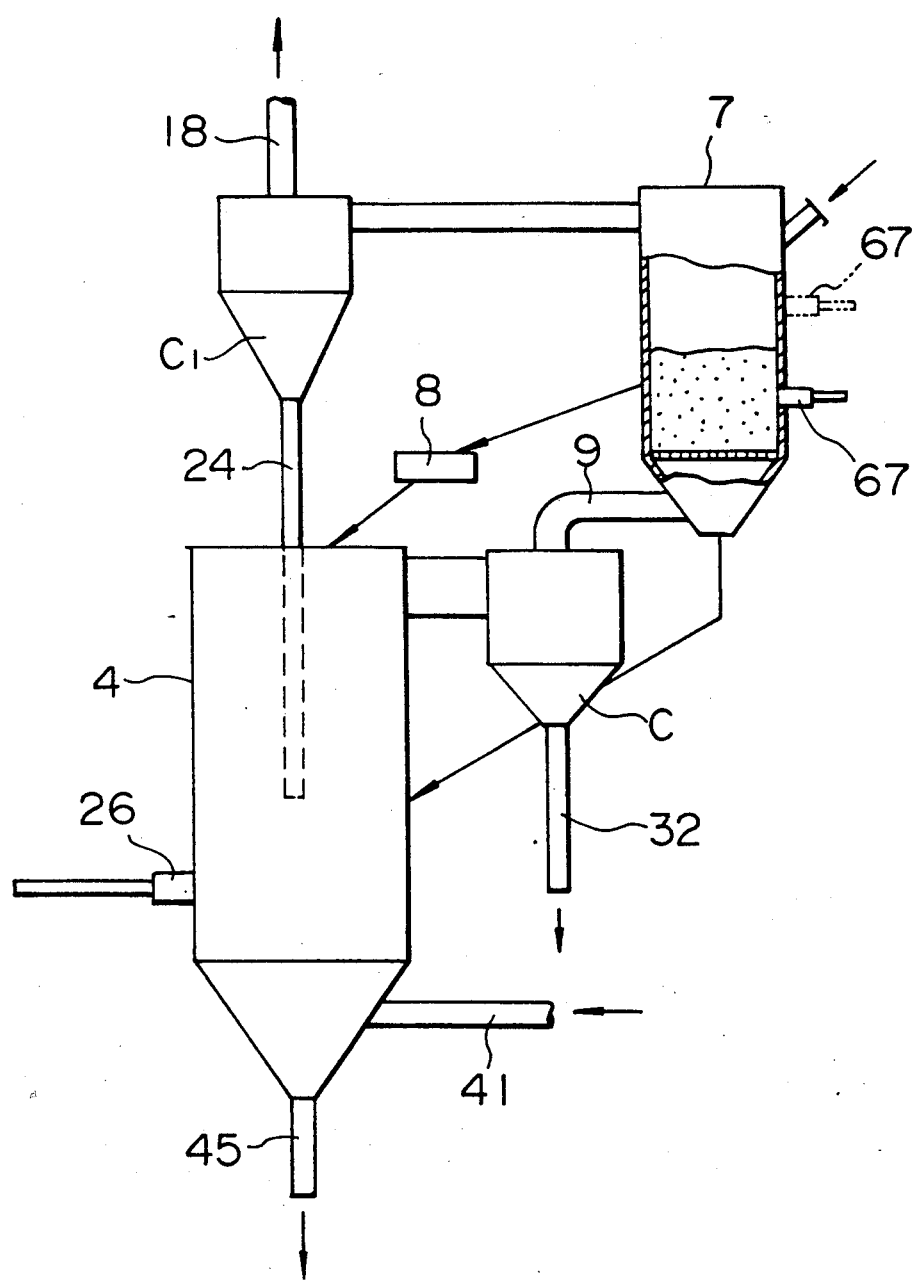
FIG. 4 is a partly cut-away front elevational view of an embodiment of the preheating apparatus of the present invention having an auxiliary burner.

A description will now be given of still another embodiment shown in FIG. 4. The embodiment shown in FIG. 4 features a preheating auxiliary burner 67 provided in the material layer or on the free board portion of at least one of the heat exchangers 7 and 7a. In operation, the auxiliary burner 67 preheats the granular material in the precalciner 7 and/or the heat exchanger 7a, thus assisting starting up of the whole system. In particular, the auxiliary burner 67 incorporated in the precalciner 7 effectively prevents re-carbonation reaction from taking place in the cyclone $C_1$ while reducing the thermal load on the calcination furnace 4 and, hence, enabling the capacity of the calcination furnace 4 to be reduced. When the rated operation is commenced after the start up, the auxiliary burner 67 may be stopped or operated intermittently as required.

As will be understood from the foregoing description, the present invention offers the following advantages.

(a) According to the invention, a precalciner of fluidized bed type or spouted-bed type is used in piece of a duct which interconnects the cyclone $C_1$ of the most downstream stage and the collecting cyclone C which is directly connected to the calcination furnace. The granular material, therefore, is allowed to stay and be fluidized for a period of 4 to 10 minutes which is much longer than that in the known art, so that heat is sufficiently exchanged between the waste gas and the granular material. Consequently, supply of hot waste gas to the cyclones $C_1$, $C_2$, $C_3$ and so forth is avoided to ensure that the temperature at which the re-carbonation reaction takes place is developed only in preselected cyclones. It is therefore possible to avoid shifting of the re-carbonation temperature region between different stages of cyclones is avoided. This facilitates the design of the whole system and offers a high efficiency of the apparatus.

(b) In a specific form of the present invention, the duct interconnecting the collecting cyclone C and the cyclone $C_1$ of the most downstream stage is substituted by the precalciner 7, whereas the duct between the cyclone $C_1$ and the cyclone $C_2$ just upstream therefrom is substituted by the heat exchanger 7a. This arrangement offers, besides the advantage (a) described above, sufficient exchange of heat between the waste gas and the granular material so as to ensure that the waste gas discharged from the heat exchanger 7a is maintained below 600° C. which is the lower limit of the temperature range in which the re-carbonation reaction can take place. This arrangement, therefore, prevents re-carbonation reaction from taking place in none of the cyclones of the suspension preheater. It is thus possible to eliminate necessity for parallel arrangement of cyclones in the stages where the re-carbonation reaction is possible to occur, as well as for complicated switching means required for enabling selective use of these parallel cyclones, thus attaining both a simplification of the construction of the apparatus and improvement in economy.

(c) In still another form of the present invention, an auxiliary burner is provided in at least one of the heat exchangers, preferably in the precalciner 7. Such an auxiliary burner not only improves the preheating efficiency but also assists the start up of the whole apparatus. In addition, the use of the auxiliary burner 67 prevents generation of re-carbonation reaction which may otherwise be caused in the cyclone $C_1$ and other cyclones, while reducing the thermal load on the calcination furnace and, hence, enabling the use of a calcination furnace having a reduced capacity.

What is claimed is:

1. An apparatus for preheating a granular material having a suspension preheater including a plurality of stages of cyclones arranged above a calcination furnace such that said granular material is preheated by waste gas from said calcination furnace as said granular material passes through said suspension preheater, said apparatus comprising: a precalcinator connected between a collecting cyclone directly connected to said calcination furnace and a first cyclone constituting the most downstream stage, and a chute connecting said precalcinator to said calcination furnace for supplying said granular material heated by said precalcinator to said calcinator furnace.

2. An apparatus according to claim 1, further comprising an additional heat exchanger of fluidized-bed type connected between said first cyclone and a second cyclone which is immediately upstream of said first cyclone.

3. An apparatus according to claim 1, further comprising another additional heat exchanger of fluidized-bed type or spouted-bed type connected between said second cyclone and a third cyclone which is immediately upstream of said second cyclone.

4. An apparatus according to claim 2, further comprising another additional heat exchanger of fluidized-bed type or spouted-bed type connected between said second cyclone and a third cyclone which is immediately upstream of said second cyclone.

5. An apparatus according to claim 1, further comprising an auxiliary burner provided in said heat exchangers.

6. An apparatus according to claim 2, further comprising an auxiliary burner provided in at least one of said heat exchangers.

7. An apparatus according to claim 3, further comprising an auxiliary burner provided in at least one of said heat exchangers.

8. An apparatus according to claim 4, further comprising an auxiliary burner provided in at least one of said heat exchangers.

9. An apparatus according to claim 1 where the precalcinator is of the fluidized-bed type.

10. An apparatus according to claim 1 where the precalcinator is of the spouted-bed type.

* * * * *